L. SYKES.
CONNECTING MEANS FOR PISTONS AND PISTON RODS.
APPLICATION FILED JUNE 7, 1919.
1,339,427.
Patented May 11, 1920.
2 SHEETS—SHEET 2.
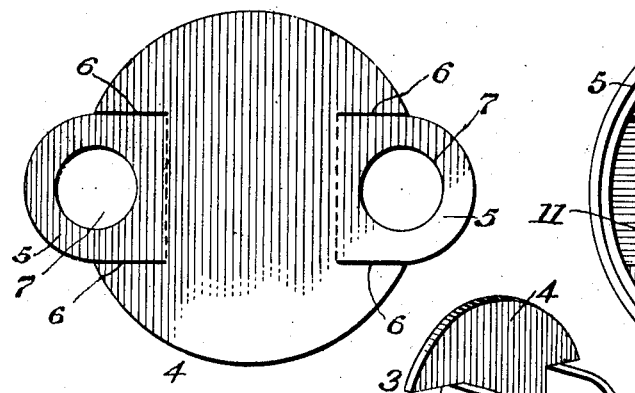
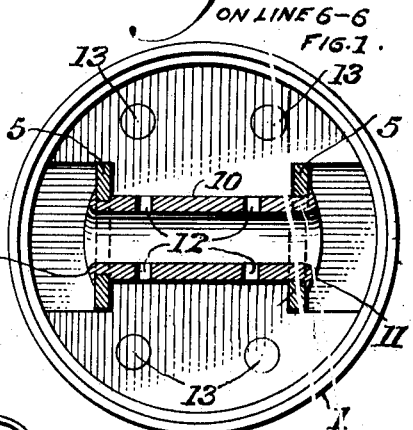
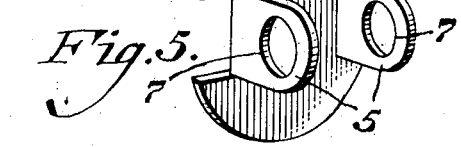
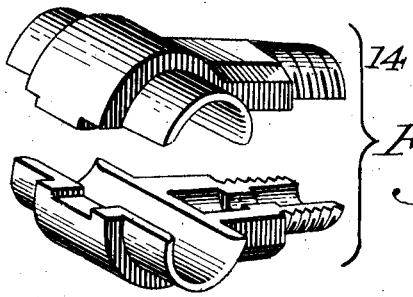
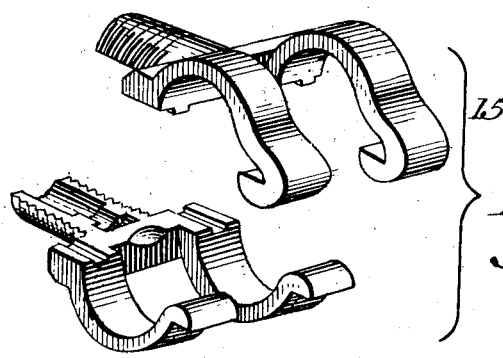
INVENTOR
Lewis Sykes.
BY
Niedersheim Fairbanks
ATTORNEYS.

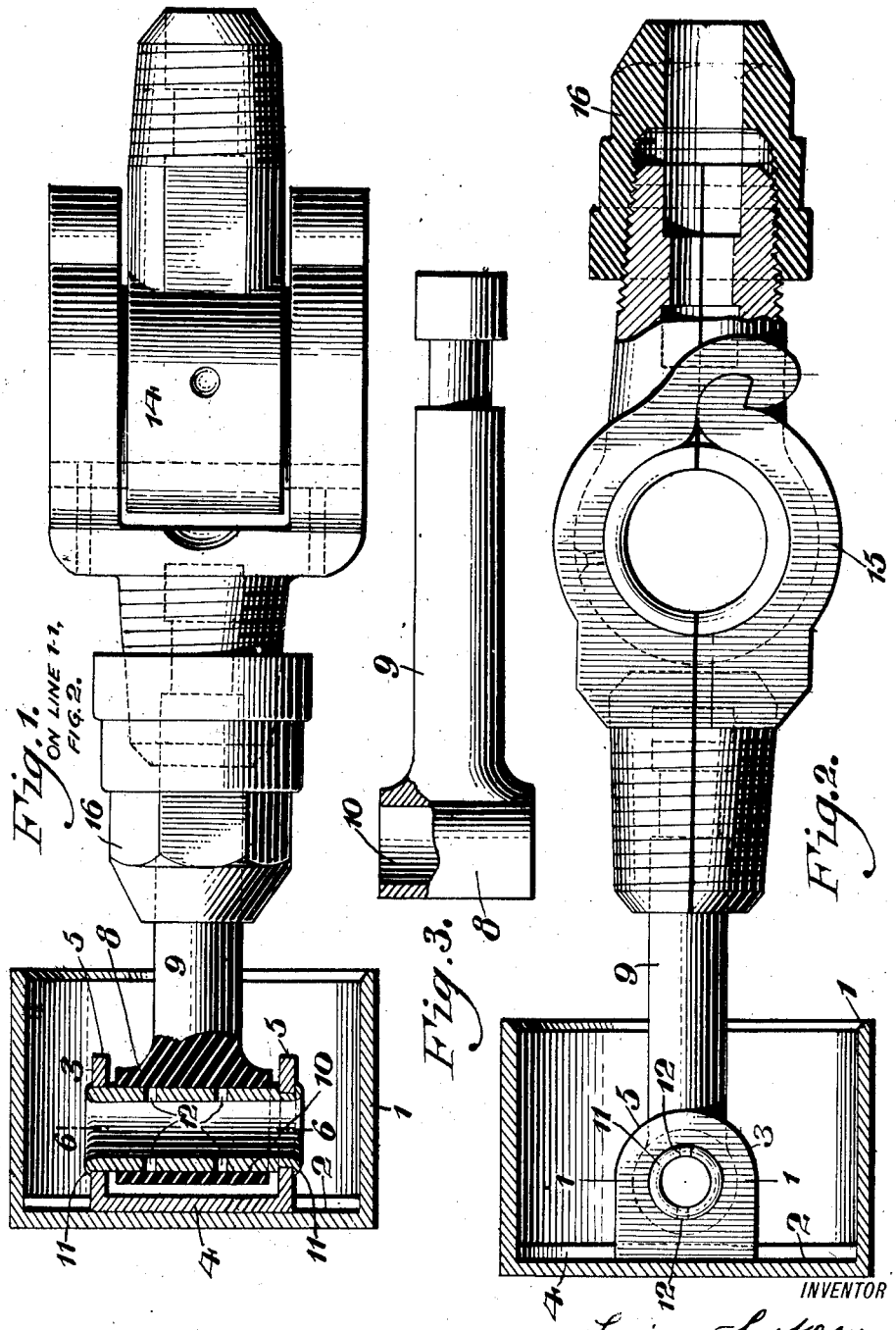

UNITED STATES PATENT OFFICE.

LEWIS SYKES, OF CAMDEN, NEW JERSEY, ASSIGNOR, BY DIRECT AND MESNE ASSIGNMENTS, TO KELLER PNEUMATIC TOOL COMPANY, OF GRAND HAVEN, MICHIGAN, A CORPORATION OF MICHIGAN.

CONNECTING MEANS FOR PISTONS AND PISTON-RODS.

1,339,427.  Specification of Letters Patent.  Patented May 11, 1920.

Original application filed November 7, 1918, Serial No. 261,517. Divided and this application filed June 7, 1919. Serial No. 302,445.

*To all whom it may concern:*

Be it known that I, LEWIS SYKES, a citizen of the United States, residing in the city and county of Camden, State of New Jersey, have invented a new and useful Connecting Means for Pistons and Piston-Rods, of which the following is a specification.

This application is a division of a contemporaneously pending application filed by me, November 7th, 1918, Serial No. 261,517, and my present invention relates particularly to a novel construction of devices or connecting means for securing a connecting rod or pitman to the piston of a pneumatic drill or similar implement in such a way that the piston and its connecting rod are durably connected and abundant provision is made for effectively lubricating the same.

In pneumatic drills or similar implements of the general type to which my invention appertains, the power is transmitted to the working tool as a drill, reamer or the like, by the transformation of a reciprocating motion into a rotary motion by means of pistons, usually single acting, which are actuated by the admission of air pressure into the cylinders carrying such pistons, the latter being connected to a crank shaft by a connecting rod, and toggle connections common to said crank shaft and connecting rod.

In the conventional, commercial drills of this general type to which my invention appertains, the cylinders are usually so arranged as to be located in the same plane and their pistons are displaced at an angle to each other of generally 90°, the connecting rod of each piston of said cylinders being connected at a single point on the crank and while my invention appertains to this general class of tools, it will be apparent that in its broad embodiments, it is equally well suited for any type of fluid operated motor having a piston or connecting rod, wherein it is essential to have a light, strong, durable and effectively lubricated connection common to the piston rod and piston.

It is well known to those skilled in the art that tools of this character are operated at extremely high speeds and are frequently subjected to rough handling and abuse in the hands of unskilled workmen, and they are also frequently misused by the absence of sufficient lubrication. As a result of these conditions the moving parts undergo severe usage and are required to withstand a considerable degree of vibration.

In prior devices with which I am very familiar, it has heretofore been the practice to employ in some instances a ball and socket connection between the piston and the contiguous end of the piston rod, which frequently causes breakage at the ball end of the piston rod, since at this point the diameter of the piston rod is somewhat reduced to allow the ball to rotate in the ball socket carried by the piston to suit the throw of the crank and in some instances, I have found that owing to the extremely high speed at which such tools are operated and the vibration to which the connecting rods are subjected as well as the extreme heat caused by the neglect of lubrication, that the ball becomes either disengaged from the socket or loose in its socket, so as to permit a considerable relative movement which in time effects such a degree of wear as to render the parts incapable of smooth and proper movement and the liability of eventual breakage is greatly increased.

To obviate the foregoing objections, I have devised my novel construction of piston rod having a T-head at its piston end and which is secured to its piston by an apertured hardened steel tube or hollow pin, whose ends are arc-welded into the ears of a suitable plate which is riveted, welded, or otherwise secured to the contiguous piston wall, said T-head end connection rotating on said hardened steel tube or hollow pin and the connection common to said T-head and piston being formed from a pierced sheet metal blank stamped into the desired shape, the swing of the piston rod being limited only by the diameter of the bore of the piston.

For the purpose of illustrating my invention, I have shown in the accompanying drawings one form thereof which is at present preferred by me, since the same will be found in practice to give satisfactory and reliable results, although it is to be understood that the various instrumentalities of which my invention consists can be variously arranged and organized and that my invention is not limited to the precise arrangement and organization of these instrumentalities as herein shown and described.

Figure 1 represents a longitudinal sectional view of a piston, connecting rod and the connecting means common to said piston and connecting rod, a portion of the connecting rod and its adjuncts being shown in elevation and the section being taken on line 1—1 Fig. 2.

Fig. 2 represents a side elevation of the piston rod and the connections common to said piston rod and its piston, the latter being shown in section.

Fig. 3 represents a side elevation of the piston rod in detached position, a portion of the latter being shown in section.

Fig. 4 represents a plan view of a blank from which the connecting means common to the piston rod and piston are made.

Fig. 5 represents a perspective view of said blank showing the ears formed thereon.

Fig. 6 represents a section on line 6—6 Fig. 1.

Figs. 7 and 8 represent perspective views of the outside and inside toggles employed.

Similar numerals of reference indicate corresponding parts in the figures.

In my contemporaneously pending application filed November 7th, 1918, Serial No. 261,517, of which the present application is a division, I have shown, described and broadly claimed a novel construction of pneumatic drill, and as my present application relates more particularly to the connecting means common to the piston rod and piston, I deem it unnecessary to describe in detail the other features disclosed in my pending application aforesaid.

1 designates a piston of the usual conventional type having secured to the head or inner wall 2 thereof, my novel piston rod connecting means 3, the same comprising a plate or body portion 4 having the ears 5 struck up therefrom. The plate or blank 4 is of circular form so as to fit nicely within the piston and is blanked out, pierced and punched, preferably in a single operation into the form shown in Fig. 4, the slits 6 and holes 7 in the ears 5 appearing as seen therein. Thereafter by a subsequent operation, the blank 4 is formed into the shape seen in Fig. 5, the ears 5 being deflected at right angles to the body portion 4 and extending parallel to each other. The space between the ears 5 is substantially the same as the length of the T-head 8 of the piston rod 9, seen in Fig. 3, said piston rod having the transverse bore 10 through the T-head thereof. The T-head 8 is assembled with respect to the ears 5 as seen in Fig. 1, and the hardened steel hollow or tubular pin 10 is inserted in position as seen in Fig. 1 and its ends 11 are arc-welded into said ears 5.

The ports 12 are provided for lubrication and the body portion of the plate 4 may be either spot-welded or riveted as indicated at 13 to the contiguous wall 2 of the piston.

I have deemed it unnecessary to describe in detail, the other elements coacting with the piston rod, as the inside toggles 14 and the outside toggles 15 and the binding nut 16, as the same, *per se*, form no part of my present invention, which relates to the construction of the connection 3 and its adjuncts common to the piston rod and piston.

It will be understood that in practice suitable interlocking devices may be provided common to the toggles and the contiguous end of the piston rod so as to prevent the latter from rotation in said toggles, and it will be apparent to those skilled in the art from the construction seen at the left-hand of Fig. 1, that the plate or body 4 being riveted to the contiguous head or piston wall will be permanently secured thereto, and since the hardened steel tube 6 is arc-welded at its extremities 11 in the ears 5, it will never under ordinary conditions become disconnected therefrom, the T-head 6 of the piston being capable of a free oscillation to the desired or necessary extent on the hardened steel tube or bearing 6, and, in addition being effectively lubricated through the medium of the ports 12.

By the employment of the hardened steel tube or hollow pin 6, it will be seen that a very light, cheap and durable construction is obtained, since said tube can be readily cut off to the desired length and the connecting member comprising the body portion 4 and the ears 5 can be blanked out or stamped from thin sheet metal by simple and inexpensive dies, which reduces the cost of production to a large degree.

The simple and effective means which I employ in securing the piston and the connecting rod makes it possible to construct the piston in a comparatively inexpensive manner, since the head 2 need not be thicker than the piston walls, for the reason that no portion or connecting parts of the piston rod extend through the piston head, whereby it is even possible to form the pistons from sheet metal as well as the connecting means 3 common to the connecting rod and piston, and since no part of the connecting rod extends through the head of the piston, it will be apparent that when the pistons and connecting rods are assembled there is no possibility or opportunity for leakage through the bottom of the piston, since there is no part of the connecting rod that extends through the piston to become loosened and admit passage of the motive fluid, which would manifestly reduce the efficiency of the tool.

While I have described my present invention herein and in my contemporaneously pending application aforesaid, as being particularly adapted to a pneumatic drill or similar implement, it will be apparent that the same is applicable to any fluid operated piston having a connecting rod secured thereto, wherein a light, durable and efficiently lubricated connection is desired, and I therefore do not desire to limit the use of my invention solely to portable pneumatic drills, although I have found it to work with perfect satisfaction therein.

It will now be apparent that I have devised a novel and useful construction of a connecting means for pistons and piston rods which embodies the features of advantage enumerated as desirable in the statement of the invention and the above description, and while I have, in the present instance, shown and described a preferred embodiment thereof which will be found in practice to give satisfactory and reliable results, it is to be understood that the same is susceptible of modification in various particulars without departing from the spirit or scope of the invention or sacrificing any of its advantages.

Having thus described my invention what I claim as new and desire to secure by Letters Patent, is:—

1. In a device of the character stated, a piston, a plate secured to the inner wall thereof and having apertured ears projecting at an angle therefrom, a hardened steel tubular pin having its ends arc-welded in said ears, and a piston rod having a T-head located between said ears and provided with a bearing through which said pin passes.

2. In a device of the character stated, a piston, a plate secured to the inner wall thereof, apertured parallel ears projecting at an angle from said plate, a piston rod having an enlarged T head having a hole therethrough located between said ears, and a hollow hardened tubular steel pin passing through said T head and ears and having its ends arc welded in said ears.

3. The combination of a piston, a plate conforming to the inner wall thereof and secured thereto, and having apertured ears projecting at an angle therefrom, a hardened steel tubular pin having its ends arc-welded in said ears, and a piston rod having one end located between said ears, and a transverse bearing through one end thereof through which said pin passes, the latter having lubricating ports therein, whereby said pin is lubricated externally and internally.

LEWIS SYKES.

Witnesses:
J. W. MEEKER,
JOHN R. HARROP.